Oct. 4, 1927. 1,644,563
C. S. BROWN
MOWING MACHINE
Filed Feb. 13, 1924 3 Sheets-Sheet 2

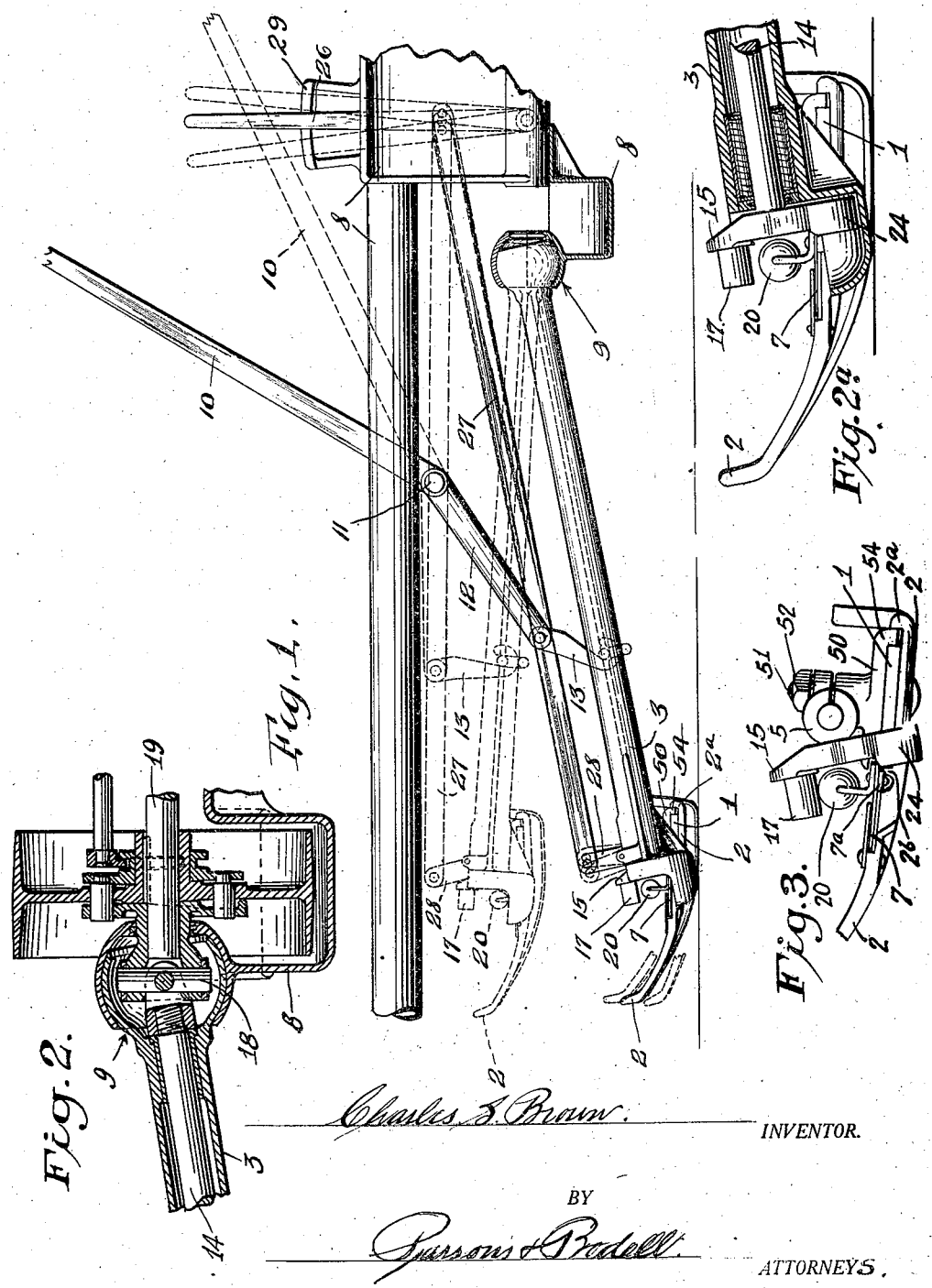

Charles S. Brown INVENTOR.

BY
Parsons & Bedell ATTORNEYS.

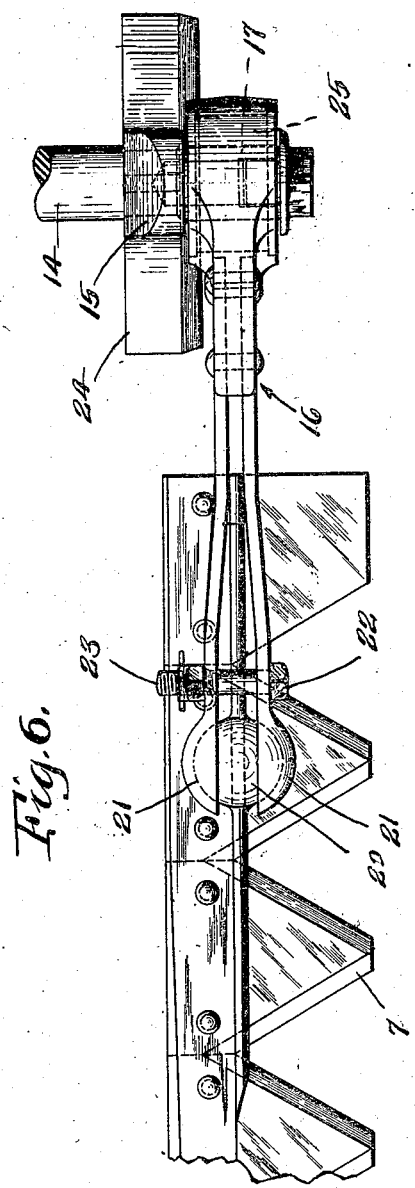
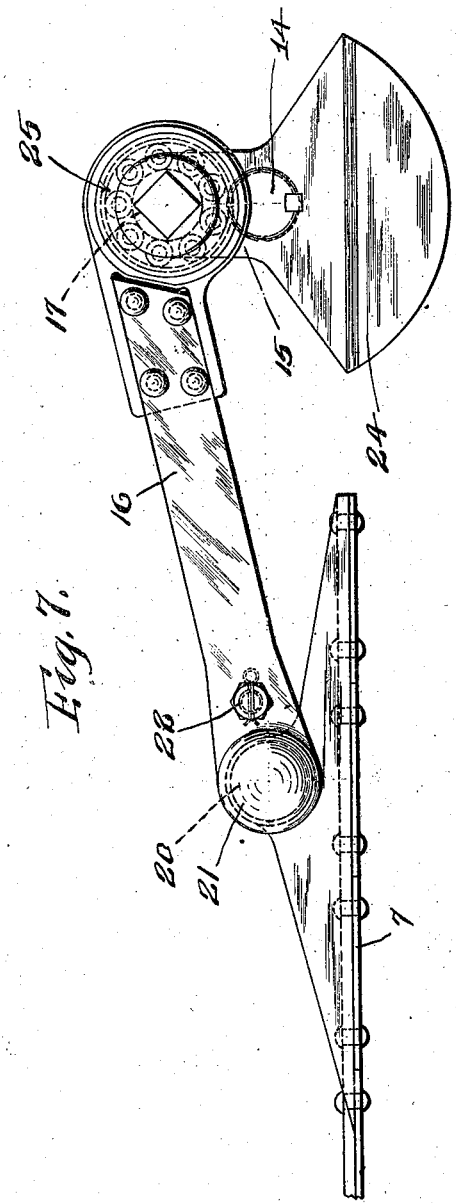

Patented Oct. 4, 1927.

1,644,563

UNITED STATES PATENT OFFICE.

CHARLES S. BROWN, OF SYRACUSE, NEW YORK.

MOWING MACHINE.

Application filed February 13, 1924. Serial No. 692,595.

This invention relates to mowing machines or machines embodying a mower or finger bar and a reciprocating knife and has for its object a particularly simple and efficient arrangement of the actuating means for the mower knife, relatively to the tilting axis of the mower or finger bar, whereby the relation of the actuation means to the knife remains practically the same during the tilting and during the bodily raising and lowering of the mower bar, or in other words, so that the pitman or connecting rod, which transmits the rotary movement of the actuation shaft to the reciprocating knife, remains practically the same relatively to the crank and knife in all tilted positions of the mower bar and also in all elevations of the mower bar to which it is raised and lowered.

The invention consists in the novel features which are hereinafter set forth and claimed.

Figure 1 is a fragmentary side elevation of a mower embodying my invention.

Figure 2 is an enlarged fragmentary view, partly in section, of the upper portion of the carrier for the mower bar and contiguous parts.

Figure 2ª is an enlarged fragmentary view partly in section of the lower portion of the carrier of the mower bar.

Figure 3 is a detail view of the parts seen in Figure 2ª showing tilted position in which the knife can be removed.

Figure 4:
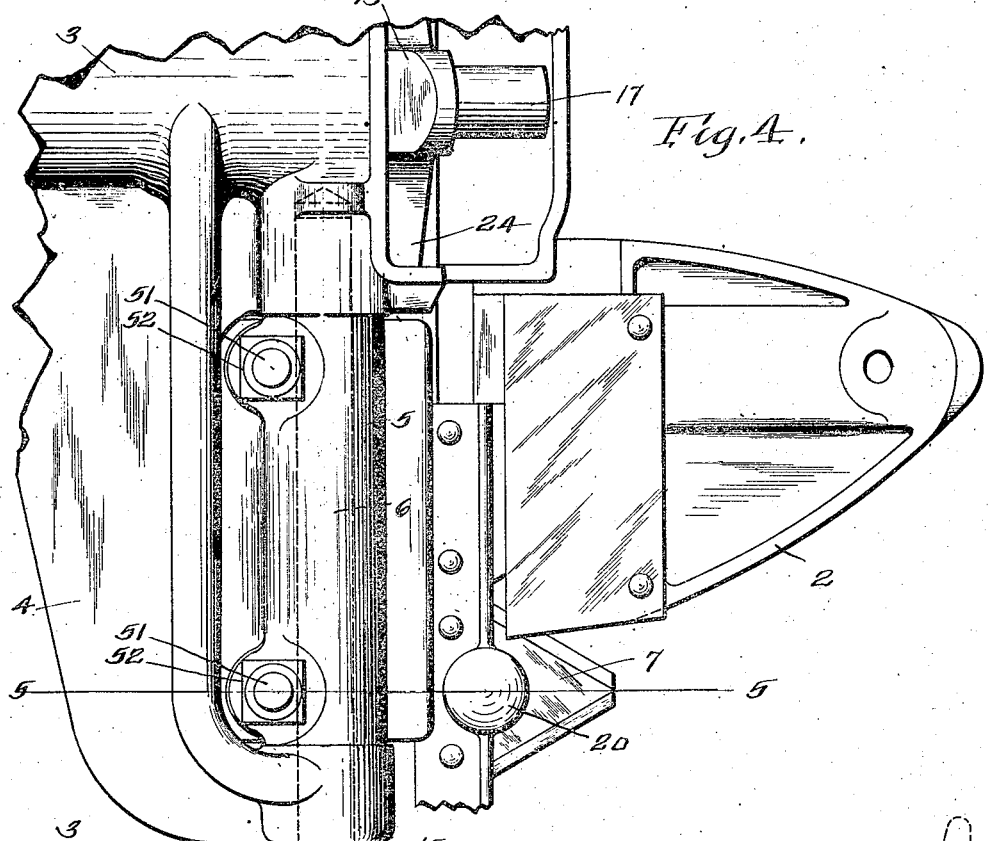

Figure 4 is an enlarged fragmentary plan view of the end of the mower bar where it is connected to the carrier for the mower bar.

Figure 5:
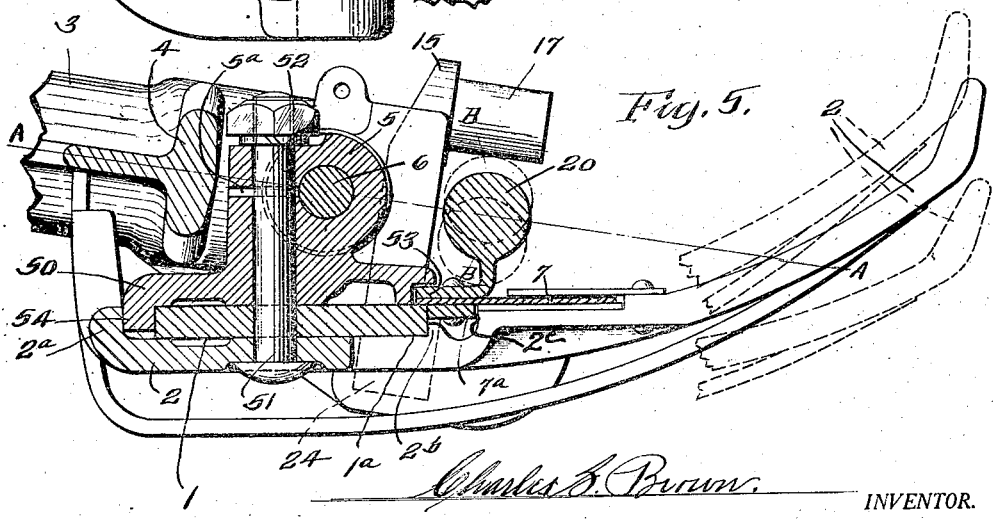

Figure 5 is a sectional view on line 5—5, Figure 4.

Figure 6 is a plan view of the pitman, the crank and the contiguous portion of the knife.

Figure 7 is an elevation of the parts seen in Figure 6.

This mower comprises generally, a cutter or finger bar, a reciprocating knife mounted on the cutter bar in the usual manner, a carrier by means of which the mower bar is supported or suspended, the finger or mower bar being pivoted to the carrier on a transverse axis extending lengthwise of the mower bar, whereby the mower bar may be tilted upwardly or downwardly to conform to the crop which the knife is cutting, means for actuating the reciprocating knife including a shaft supported by the carrier, a crank on the shaft, a connecting rod or pitman mounted at one end on the crank pin of the crank and connected at its other end to the knife by a universal or ball and socket joint, this ball and socket joint being so arranged relatively to the tilting axis of the mower bar and to the axis of the actuating shaft or the crank pin thereon that such joint during the tilting of the mower bar moves in a small arc approximating a straight line at a right angle to the crank pin, so that the driving relation of the pitman, the crank pin and the mower knife remains practically the same in all tilted positions of the mower bar.

1 is the mower, cutter or finger bar, which may be of any suitable form, size and construction, including usual shoes at its inner and outer ends. 2 is the shoe at the inner end, 3 is the carrier for the mower bar. This carrier, as here shown, comprises a tube having a bracket or yoke 4 at its lower or front end, to which the mower bar is pivoted on an axis extending lengthwise of the mower bar. As is here illustrated, the shoe 2 has associated therewith a bearing 5 connected to the bracket or yoke 4 by a pin or shaft 6, the axis of which extends transversely of the carrier or of the mowing machine and lengthwise of the mower bar. 7 is the reciprocating knife.

The bearing 5 is here shown as split at 5ª and formed integral with a base plate 50 which rests on the cutter bar and the shoe 2. The mower bar 1 and the plate 50 are secured together and the bearing 5 clamped on the shaft 6 by bolts 51 extending through the shoe 2, the bar 1, the plate 50 and the split bearing 5 from the lower side of the shoe, and nuts 52 on the upper ends of the bolts. The plate 50 is also formed with an angular flange 54 at its rear edge fitted between the rear edge of the bar 1 and a flange 2ª at the rear edge of the shoe 2, the front edge of the bar abutting against a rib 2ᵇ on the shoe. Thus the shoe, mower bar and knife and the carrier are held in assembled relation by the bolts 51. The flange 2ª and rib 2ᵇ provide a channel wider than the bar 1 in which the bar is interlocked by the flange 54 on the plate 50.

The mower bar 1 abuts at its front edge at 1ª against the knife back 7ª, and the plate 50 is formed with a channel 53 at its front edge which overhangs the mower knife back or the base plate for the ball of the ball and socket joint to be described, and guides the knife 7 in its reciprocating movement. That is, the knife back slides in a groove formed by the front edge of the bar 1 at 1ª, and the shoe 2 at 2ᶜ.

The carrier or tube 3 is connected at its rear end to the main frame 8 by a universal or ball and socket joint 9 which permits the carrier and mower bar to be raised and lowered without affecting the driving shaft for the knife. The carrier is flexibly supported in any well known manner to permit the cutter bar to float over and conform to the unevenness of the ground. The carrier 3 is elevated and lowered by any suitable means, here shown, as a lever 10 pivoted at 11 to the main frame and having an arm 12 on the other side of its axis which arm is connected by a link or hook 13 to the carrier 3. Obviously, upon movement of the lever 10, the carrier 3 and the mower bar, will be raised or lowered. As seen in Figure 3, when the mower bar is tilted upwardly in one of its positions, the knife can be slid out past the crank for the purpose of repairing or sharpening the knife, the pitman having been first detached from the crank and the ball of the ball and socket joint.

The means for actuating or reciprocating the mower knife 7 comprises a shaft 14 suitably journalled in and extending lengthwise of the carrier 3 and having a crank 15 at its front end and a connecting rod or pitman 16 mounted at one end on the crank pin 17, and connected at its other end by a ball and socket joint to the mower knife.

The rear end of the shaft 14 is connected by a universal joint 18 to a suitable power or drive shaft 19 which is actuated in any suitable manner and controlled through a suitable clutch. The center of the universal joint 18 is at the center of the joint 9, so that movement of the carrier up and down does not affect the operation of the shafts 14, and 19 on the joint 18. The shaft 14 being located in the carrier tube 3, winding of grass or grain on the shaft is prevented.

20 designates the ball of the ball and socket joint, which ball is arranged near and usually slightly in front of the axis of the shaft 6, or the tilting axis of the mower bar, and is arranged also preferably to be intersected by a plane common to or containing the axes of the shaft 14, and preferably in one position designated by the line A—A of Fig. 5. 21, 21 are socket sections carried by opposite arms of the pitman, said arms being drawn toward each other to adjust the socket on the ball by a bolt and nut 22, 23. The crank is usually formed with a counter-balance 24 and the pitman is mounted on the crank pin by an anti-friction bearing 25.

The movement of the ball 20, during the tilting of the mower bar 1 and shoe 2 is up and down in an arc about the shaft 6 which arc lies practically or approximately in the plane of rotation of the pitman 16.

Owing to the arrangement or location of the ball 20 of the ball and socket joint relatively to the shaft 6 or the tilting axis of the mower bar and to the shaft 14 and crank 15, the ball and socket moves in a small arc, designated B—B, struck from the center of the shaft 6, such arc approximating, for all practical purposes a straight line in the plane of rotation of the pitman. Thus the relation of the connecting rod to the crank pin and to the ball and socket joint remains practically the same in all tilted positions of the mower bar, so that there is practically no or very little side motion of the pitman on the crank pin in the different tilted positions.

Also, the ball in one of the tilted positions moves in a line or plane containing the axis of the shaft 14 and when the mower bar is tilted up or down, the ball is offset from such plane but very little, and hence the knife is reciprocated with minimum side thrust and friction. Or the line of movement of the ball 20 passes near the axis of the shaft 14 in all tilted positions of the mower bar and when the mower bar or shoe 2 is in central position, that is not tilted up or down, such line intersects the axis of the shaft 14.

The mower bar may be tilted by any suitable means, that here shown being manually operable and consisting of a hand lever 26 pivoted to the main frame and connected by a link 27 to an arm 28 extending upwardly from the shoe 2 substantially radial with the tilting axis 6 of the mower bar. The hand lever 26 is held in any position by the usual rack and pawl the rack or segment being indicated at 29.

What I claim is:

1. In a mowing machine, a mower bar, a reciprocating knife, a carrier for the bar, a pivot connecting the carrier and the inner end of the bar, the pivot extending lengthwise of the bar whereby the bar is tiltable relatively to the carrier, means for reciprocating the knife comprising a shaft journalled in the carrier radial with the axial line of the pivot, a crank on the shaft, a pitman connecting the crank and the knife and connected to the knife by a ball and socket joint and means for tilting the mower bar.

2. In a mowing machine, a mower bar, a reciprocating knife, a carrier for the bar, a pivot connecting the carrier and the inner end of the bar, the pivot extending lengthwise of the bar whereby the bar is tiltable relatively to the carrier, means for reciprocating the knife comprising a shaft journalled in the carrier radial with the axial line of the pivot, a crank on the shaft, a pitman connecting the crank and the knife and connected to the knife by a ball and socket joint, the ball and socket joint being movable near and in a line parallel to the pivot of the mower bar and approximately in the plane of movement of the pitman in all tilted positions of the mower bar, and means for tilting the mower bar.

3. In a mowing machine, a mower bar, a reciprocating knife, a carrier for the bar, a pivot connecting the carrier and the inner end of the bar, the pivot extending lengthwise of the bar whereby the bar is tiltable relatively to the carrier, means for reciprocating the knife comprising a shaft journalled in the carrier radial with the axial line of the pivot, a crank on the shaft, a pitman connecting the crank and the knife and connected to the knife by a ball and socket joint located in the front of the axis of said pivot and near such axis and means for tilting the mower bar.

4. In a mowing machine, a frame, a mower bar, a reciprocating knife mounted on the bar, a carrier for the bar, the bar being pivoted to the carrier whereby it is tiltable about an axis extending lengthwise of such bar, means for actuating the knife comprising a drive shaft journalled in the frame, a driven shaft journalled in the carrier, a universal joint connecting the rear end of the driven shaft and the front end of the driving shaft, a casing enclosing the driven shaft and the universal joint, comprising ball and socket sections concentric with the universal joint.

5. In a mowing machine, a mower bar, a reciprocatory knife mounted on the bar, a carrier for the bar, the bar having a shoe at its inner end, a member formed with a bearing, the carrier having a pivot on which the bearing is mounted whereby the bar is tiltable about an axis extending lengthwise of the bar, and means common to the shoe and member for securing them together and for securing the bearing on the pivot.

6. In a mowing machine, a mower bar, a reciprocatory knife mounted on the frame, a carrier for the bar, the bar having a shoe at its inner end and having means formed with a bearing, the carrier having a shaft on which the bearing is mounted whereby the mower bar and its shoe are pivoted to the carrier on a transverse axis and the bar and shoe are tiltable about an axis extending lengthwise of the bar, means common to the shoe, mower bar, and the carrier to hold said parts in assembled relation.

7. In a mowing machine, a mower bar, a reciprocatory knife mounted on the bar, the bar having a shoe at the inner end thereof, the carrier being formed with a laterally extending yoke, a shaft mounted in the yoke and extending in a direction lengthwise of the bar, a plate mounted on the mower bar, and having a split bearing on the shaft, and clamping means extending through the shoe, the bar, the plate and the split bearing to hold the shoe, mower bar, plate and split bearing in assembled relation on said shaft.

8. In a mowing machine, a mower bar, a reciprocatory knife on the bar, the bar having a shoe at the inner end thereof, the carrier being formed with a laterally extending yoke, a shaft mounted on the yoke and extending in a direction lengthwise of the bar and the shoe being formed with a channel in which one end of the bar is seated, the channel being wider than the bar, a plate mounted on the mower bar and having a split bearing on the shaft, the plate having a flange located between one edge of the mower bar and one side of said channel and the mower bar abutting on its other edge against the other side of the channel and clamping means extending through the mower bar, the shoe, the plate and the split bearing to hold said parts in assembled relation on the shaft.

In testimony whereof, I have hereunto signed my name, at Syracuse, in the county of Onondaga, and State of New York, this 25th day of January, 1924.

CHAS. S. BROWN.